United States Patent
Suzuki et al.

[11] Patent Number: 5,602,484
[45] Date of Patent: Feb. 11, 1997

[54] DELAY-SPREAD SENSOR AND DETECTION SWITCHING CIRCUIT USING THE SAME

[75] Inventors: Hiroshi Suzuki, Yokosuka; Kazuhiko Fukawa, Yokohama, both of Japan

[73] Assignee: NTT Mobile Communications Network Inc., Tokyo, Japan

[21] Appl. No.: 373,219
[22] PCT Filed: Oct. 11, 1994
[86] PCT No.: PCT/JP94/01691
  § 371 Date: Jan. 18, 1995
  § 102(e) Date: Jan. 18, 1995
[87] PCT Pub. No.: WO95/10888
  PCT Pub. Date: Apr. 20, 1995

[30] Foreign Application Priority Data
Oct. 12, 1993 [JP] Japan .................. 5-254531

[51] Int. Cl.$^6$ .................................................. H03D 3/00
[52] U.S. Cl. ................................ 324/647; 329/316
[58] Field of Search ...................... 324/647; 329/316

[56] References Cited

U.S. PATENT DOCUMENTS

| | | | |
|---|---|---|---|
| 4,253,184 | 2/1981 | Gitlin et al. | 375/14 |
| 4,849,996 | 7/1989 | Kamerman | 375/118 |
| 5,020,078 | 5/1991 | Crespo | 375/12 |
| 5,134,464 | 7/1992 | Basile et al. | 358/12 |
| 5,159,282 | 10/1992 | Serizawa et al. | 329/316 |

*Primary Examiner*—Kenneth A. Wieder
*Assistant Examiner*—Barry C. Bowser
*Attorney, Agent, or Firm*—Pollock, Vande Sande & Priddy

[57] ABSTRACT

A multipath component detector detects the correlation between a received signal and a reference signal in a training period of the received signal and estimates and outputs the multipath received component levels at a plurality of timing points. A component ratio calculator calculates the ratio of each received component to the overall received power. By this, the level ratio of a specified received component can be detected. Power dissipation can be minimized by switching the detector to a differential detector or an adaptive equalizer in accordance with the result of the delay spread measurement.

8 Claims, 8 Drawing Sheets

DELAY-SPREAD SENSOR AND DETECTION SWITCHING CIRCUIT USING THE SAME

TECHNICAL FIELD

The present invention relates to a delay-spread sensor for measuring a delay spread which is caused by multipath propagation in digital transmission for mobile communications, and a detection switching circuit using the sensor.

In digital radio transmission system such as mobile radio communication systems, it is necessary to overcome deterioration of the transmission characteristic caused by fading resulting from multipath propagation. Conventionally, a demodulating scheme employs a differential detector which is resistant to level and phase variations. With the speeding up of the digital signal or its transmission over a wide area, a delay spread by a delay time difference in the multipath propagation increases, and an adaptive equalizer is needed to overcome a received signal waveform distortion. However, the amount of signal processing required of the adaptive equalizer becomes tens of times larger than that of the delay detector—this inevitably leads to a sharp increase in power consumption. With the spread of mobile communication services, portable-type mobile stations are on the increase; hence, simplification of the algorithm used and development of low power dissipation ICs are needed to reduce the power consumption of the adaptive equalizer.

With the goal of low power dissipation, hardware development is proceeding but also studies are given an algorithm for optimum switching between the adaptive equalizer and the delay detector. To implement such an algorithm, a delay-spread sensor is required to detect the delay spread. An equivalent to the delay-spread sensor is disclosed in, for example, Mutsumi Serizawa and Minoru Ikukata, "Adaptive Automatic Equalizer Operation Control Circuit for Digital Mobile Communication", '90 IECEJ Autumn National Meeting, B-281, November, 1990, or Kazuhiko Fukawa and Hiroshi Suzuki, "Adaptive Control Method for Delay Detection and Adaptive Maximum Likelihood Sequence Estimation", 1992 IECEJ Autumn National Meeting, B-258, 1992.

FIG. 1A is a prior art example of a mobile station receiving unit. For instance, a PSK-modulated radio frequency signal received by an antenna 8 is converted by a radio-frequency receiving part 9 to an intermediate-frequency signal $S_{IF}$, which is limiter-amplified by a limiter amplifier (a nonlinear amplifier) 11 and then differentially detected by a differential detector 12, by which a code sequence is reconstructed. As is well-known in the art, the differential detector 12 has such a construction as depicted in FIG. 1B, in which the limiter-amplified input intermediate-frequency signal $S_{IF}$ and a reference carrier signal, obtained by delaying $S_{IF}$ for a one symbol duration T by a delay element 12D1, are multiplied by a multiplier 12M1, then the phase of the output from the delay element 12D1 is delayed $\pi/2$ by a delay element 12D2 and the delayed output is provided to a multiplier 12M2 for multiplication by the intermediate-frequency signal $S_{IF}$. The multiplied outputs from these multipliers 12M1 and 12M2 are provided to a decision circuit 12C via low-pass filters 12F1 and 12F2, respectively, which compares them with threshold values to make a decision on their levels and provides the decision outputs as an in-phase component I(t) and a quadrature component Q(t).

On the other hand, the intermediate-frequency signal $S_{IF}$ is also applied to an AGC linear amplifier 13 for linear amplification and the amplified output is provided to an IQ detector (quasi-synchronous detector) 14, wherein its in-phase component (an I component) and quadrature component (a Q component) are detected. The code sequence is reconstructed by an adaptive equalizer 15 from these I and Q components. As is well-known in the art, the adaptive equalizer 15 is formed as an adaptive prediction circuit which is composed of a subtractor 15S, a channel parameter estimation part 15P, a code sequence estimation part 15E, a modulation part 15M and a transversal filter 15T, as shown in FIG. 1C, for instance. The output r(t) from the IQ detector 14 is fed to the subtractor 15S which subtracts therefrom a replica RP of the received signal generated by the transversal filter 15T and outputs the resulting error signal $\epsilon$. Based on the likelihood derived from the error signal $\epsilon$, the code sequence estimation part 15E estimates the transmitted code sequence through use of a maximum likelihood sequence estimation algorithm such as a Viterbi algorithm. The estimated code sequence is provided to the modulation part 15M, wherein it is subjected to the same modulation as that effected at the transmitting side, and the modulated signal is applied to the transversal filter 15T to generate the replica RP of the received signal; the transversal filter simulates the channel. The parameter estimation part 15T estimates a channel parameter such that the absolute value of the error signal $\epsilon$ is minimized, and the estimated parameter is provided as a tap coefficient to the transversal filter 15T. This construction is well-known.

In FIG. 1A, if a delay spread of the received wave by multipath propagation becomes larger than a transmission symbol period T, the delay detector 12 will cause an error. On the other hand, even if the delay spread is large, an error of the adaptive equalizer 15 can be made significantly small by increasing the accuracy of the estimation of the channel impulse response, but this requires power more than 10 times that needed for the delay detector. In view of this, a control circuit 16 is used to perform optimal switching between the adaptive equalizer 15 and the differential detector 12 by controlling a switch SW, depending on whether a predetermined one of or a desired combination of the items, such as listed below, satisfy prescribed conditions: (1) the magnitude of an error which is induced during adaptive equalization processing by the adaptive equalizer 15, (2) the magnitude of the half power width of the output from a correlator for clock regeneration use or a change in the position of its peak value and (3) the error rate of a preknown training signal detected by the differential detector 12. At the same time, the control circuit effects ON-OFF control of the power supply to the limiter amplifier 11, the differential detector 12, the linear amplifier 13, the IQ detector 14 and the adaptive equalizer 15.

To make decisions on such items, however, it is necessary to average the results of measurements made on the items for a relatively long period of time—this leads to a defect that the efficiency of the selective operation of the two detectors cannot be increased. Furthermore, the utilization factor of the adaptive equalizer 15 by the conventional switching between the adaptive equalizer 15 and the differential detector 12 is as much as several percent even when the delay spread is small, and the power dissipation of the adaptive equalizer, even if improved, is expected to be more than 10 times that of the differential detector; hence the effect of reducing the power dissipation by selective switching is insufficient unless the utilization factor is suppressed below 1%. That is, a delay spread sensor of high accuracy is needed.

An object of the present invention is to provide a delay spread sensor which permits short-time, highly accurate measurement of a delay spread.

Another object of the present invention is to provide a detection switching circuit using such a delay spread sensor.

SUMMARY OF THE INVENTION

The delay spread sensor according to a first aspect of the present invention is provided with a multipath component detector which detects the correlation between an input signal and a predetermined reference signal and estimates and outputs the received component level for each different path, and a component ratio calculator which calculates a specific received component level ratio for the entire received power.

The detection switching circuit according to a second aspect of the present invention comprises: nonlinear amplifying means for nonlinearly amplifying an input signal; differential detecting means for differentially detecting the output from the nonlinear amplifying means; linear amplifying means for linearly amplifying the input signal; reference signal generating means for generating a reference signal corresponding to a predetermined training signal; IQ detecting means for IQ detecting the output from the linear amplifying means; adaptive equalizing means for decoding the detected output from the IQ detecting means through adaptive equalization processing; multipath component detecting means which carries out the correlation between a selected one of the differentially detected output or the IQ detected output and the reference signal in the training signal period of the received signal and estimates and outputs the received signal component level for each different path; component ratio calculating means for calculating the received signal component level ratio for each path to the received signal component levels of all paths detected by the multipath component detecting means; output switching means for selectively outputting any one of the differentially detected output and the adaptive-equalization-processed output; and control means which, on the basis of the component level ratio, controls the output switching means to select one of the differentially detected output and the adaptive-equalization-processed output and, at the same time, stops the power supply to that one of the differentially detecting means and the adaptive equalizating means which corresponds to the non-selected output.

The multipath component detector estimates the received component level at every timing through correlation processing of the received signal and the reference signal. The component calculator calculates the received component level ratio to the overall received power. This permits the detection of a specified received level ratio, from which the delay spread can be measured with high accuracy.

Furthermore, it is possible to select a detection system optimum for the received signal by switching the detector to the differential detector of adaptive equalizer in accordance with the delay spread measured results.

DESCRIPTION OF THE PREFERRED EMBODIMENTS

Figure 1A:
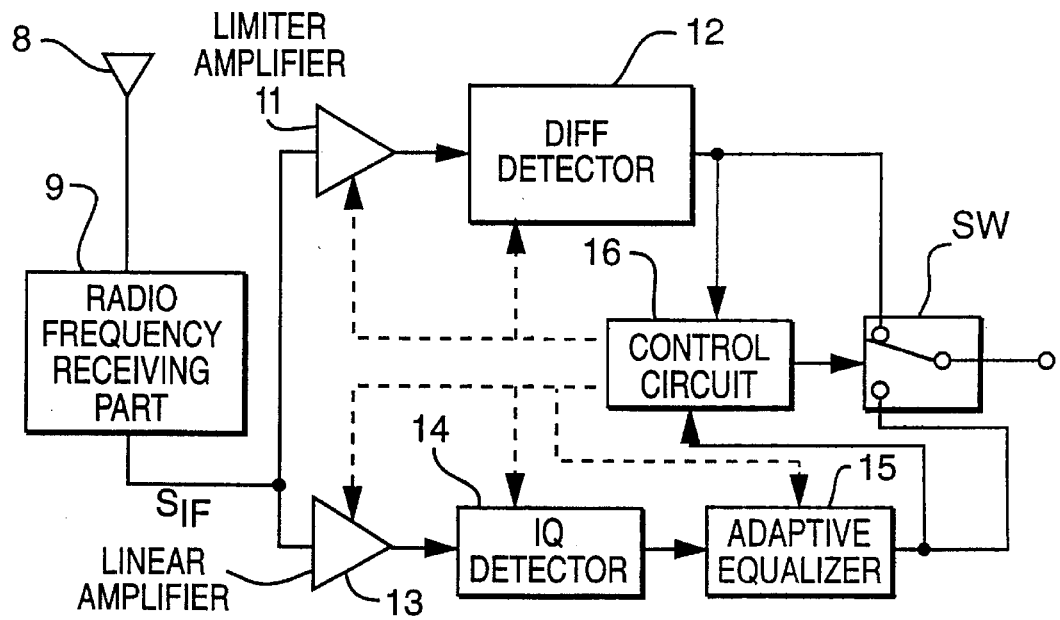
FIG. 1A is a block diagram showing an example of a conventional receiving unit for mobile stations.
Figure 1B:
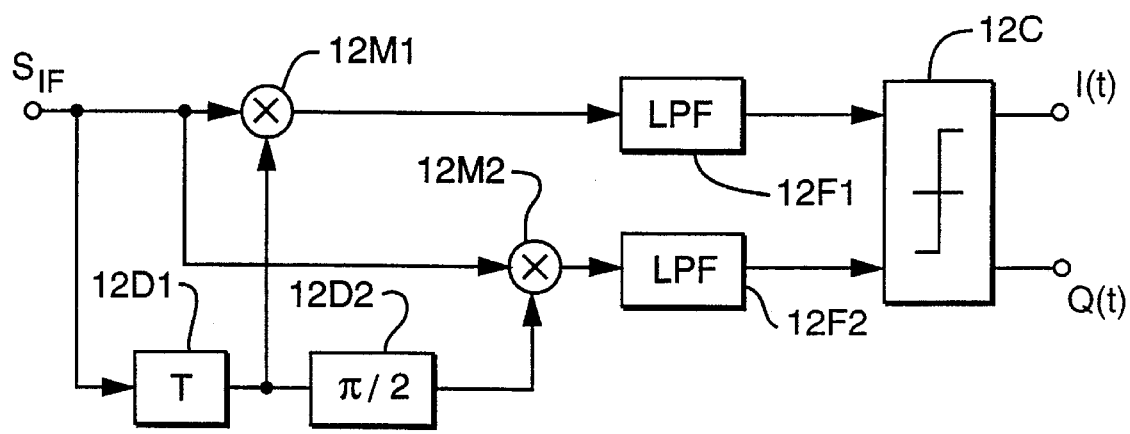
FIG. 1B is a block diagram showing an example of the construction of a differential detector 12 in FIG. 1A.
Figure 1C:
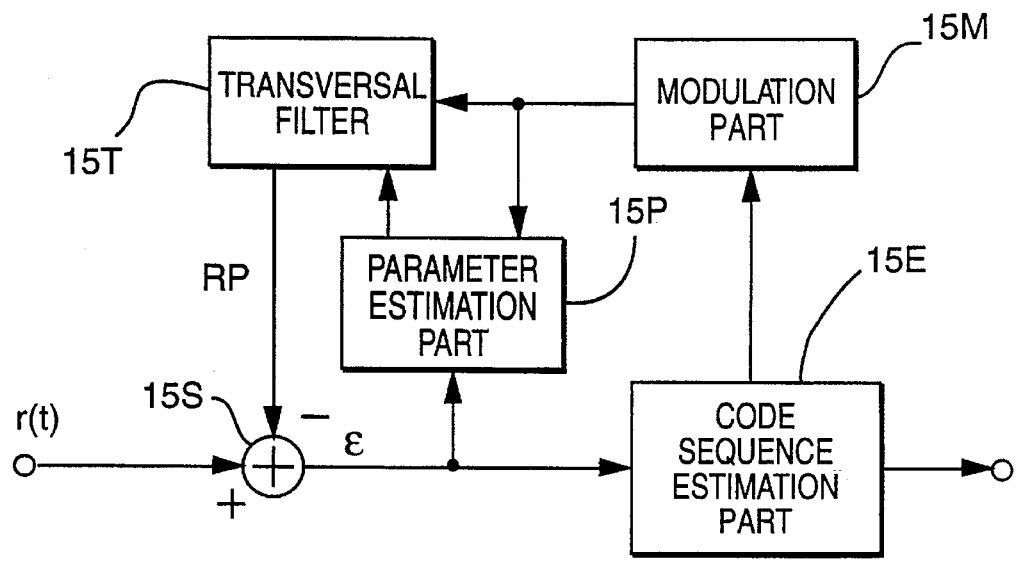
FIG. 1C is a block diagram showing an example of the construction of an adaptive equalizer 15 in FIG. 1A.
Figure 2:
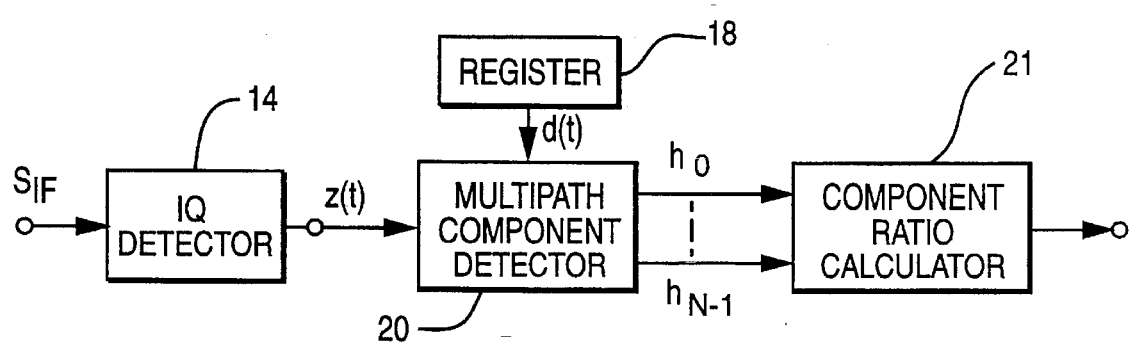
FIG. 2 is a block diagram illustrating the construction of the delay spread sensor according to the present invention.

FIG. 2 illustrates in block form a first embodiment of the delay spread sensor according to the present invention, which features a multipath component detector 20 which detects the correlation between an input signal $z(t)$ and a reference signal $d(t)$ and estimates and outputs received component levels $h_0, h_1, \ldots, h_{N-1}$ for respective paths and a component ratio calculator 21 which calculates specific received component level ratios of all received components to the received power. In this embodiment, the output $z(t)$ from a quasi-synchronous detector (referred to also as an IQ detector) 14 which quasi-synchronously detects the intermediate-frequency signal $S_{IF}$ in FIG. 1A, for instance, is shown to be provided as the input signal to the multipath component detector 20. In the following description, the input signal $z(t)$ will sometimes be referred to as a received signal or modulated signal. Let it be assumed that every signal is expressed in the form of a complex number. That is, the real part of the signal represents the amplitude of the in-phase component of a modulated wave and the imaginary part represents the amplitude of the quadrature component. The multipath component detector 20 is further supplied, as the reference signal $d(t)$, with a preknown training signal held in a register 18, for instance. Assume that the reference signal $d(t)$ is modulated into the same type as that of the received signal.

Figure 3:
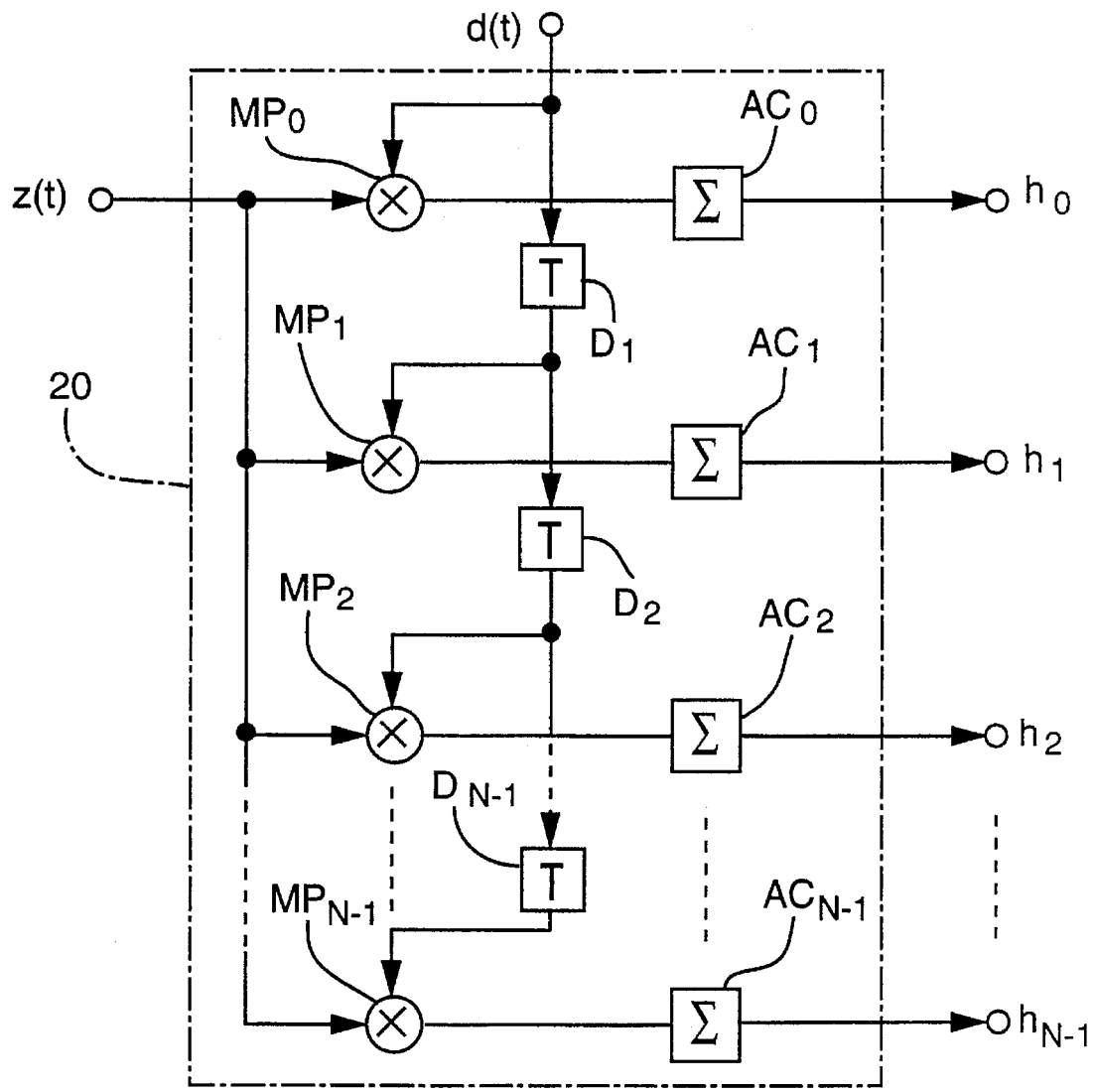
FIG. 3 is a block diagram illustrating an example of the construction of a multipath component detector in FIG. 2.

FIG. 3 illustrates an example of the inner construction of the multipath component detector 20. The reference signal $d(t)$ is converted, by N−1 stages of series-connected delay elements $D_1, D_2, \ldots, D_{N-1}$ each having a delay time of a symbol period T, to N reference signals $d(t-nT)$ (n=0, 1, ..., N−1) sequentially delayed by integral multiples nT of a modulation symbol timing interval T of the transmitted wave. The quasi-synchronously detected input signal $z(t)$ and the N reference signals $d(t-nT)$ are multiplied by multipliers $MP_0, MP_1, \ldots, MP_{N-1}$ and the multiplied values are accumulated by accumulators $AC_0, AC_1, \ldots, AC_{N-1}$, whereby respective values of the correlation of the input signal z(t) to the N delayed reference signals (including zero delay) are obtained. By this, input component complex amplitudes $h_0, h_1, \ldots, h_{N-1}$, at N timings are estimated and outputted from the multipath component detector 20. That is, when the received signal quasi-synchronously detected output z(t) is provided in the training signal period of the delay-spread received signal, the delay-spread received training signal as the input signal z(t) and the training signal as the reference signal d(t) are subjected to an inner product calculation (a convolution), thereby obtaining power levels of the signal components of the paths corresponding to the respective delay times.

Based on the outputs $h_0, h_1, \ldots, h_{N-1}$, the component ratio calculation 21 calculates the ratio $\rho_n$ of the received component level of a desired path to the overall received power. The sum of squares of the absolute values of these components is the overall power $P_o = |h_0|^2 + \ldots + |h_{N-1}|^2$. Hence $\rho_n = |h_n|^2/P_o$ expresses the ratio of an n-symbol delayed component. A value $\bar{\tau}$, obtained by averaging a delay time $\tau_n = nT$ (n=0, 1, ... N-1) from a direct wave with a weight $\rho_n$, is representative of an average delay time. Furthermore, a delay spread $\Delta\tau$ means the square of a variance obtained by averaging the square of the difference between $\tau_n$ and $\bar{\tau}$ with the weight $\rho_n$, that is a standard deviation. Therefore, the ratio $\rho_n$ is an important parameter which defines the delay spread. For example, when the delay in the multipath is within the one symbol time T, there are contained in the input signal z(t) the components d(t) and d(t-T), that is, the direct wave component $h_0$ and the delayed wave component $h_1$. These components are used to calculate, for example, the one-symbol delayed component ratio $\rho_1$ as follows:

$$\rho_1 = |h_1|^2/(|h_0|^2 + |h_1|^2) \quad (1)$$

In this example, n=0, 1. In general, when n=0, 1, ... N-1, substitution of the overall power $|h_0|^2 + \ldots + |h_{N-1}|^2$ into the denominator of Eq. (1) and a desired component $|h_n|^2$ into the numerator yields the level ratio $\rho_n$ of each component. The level ratio $\rho_n$ of each multipath component can be used as information for the switching between the adaptive equalizer and the delay detector and for control of the power supply to respective parts in the receiving unit described later on.

Figure 4:
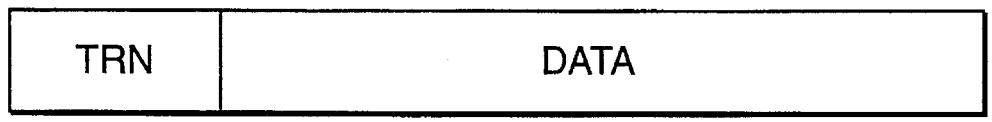
FIG. 4 is a block diagram showing the configuration of a transmission signal.

FIG. 4 is a diagram showing the configuration of the received signal. For example, when signals are transmitted by the TDMA scheme, a burst signal of a fixed length as shown in FIG. 3, which contains a training signal TRN and data DATA, is received in each receiving unit in a specified time slot for each frame. In the embodiment of the present invention, to accurately measure the delay spread in a short time, the multipath component detector 20 performs the processing of detecting the correlation between the received training signal and the training signal d(t) as the reference signal in the training period of the received signal. The training signal TRN is usually in the forward or central portion of the input signal sequence as shown in FIG. 4 and the contents of the signal sequence are preknown at the receiving side. Since the contents of the signal sequence are preknown, the reference signal for the detection of the correlation has no error, ensuring accurate detection of the correlation. Since the insertion of the training signal decreases the information transmission efficiency, the training signal is usually made as short as possible. On this account, a bias component is often superimposed on the correlation detected value. The bias component is a fixed error superimposed on a statistically estimated value. The amount of correction of this bias can be obtained through calculation. In the case of obtaining it by experiments or simulation, the value of the bias component is set to a condition $E_b/N_o \to \infty$ in one static wave with no delay and the amount of correction of the bias is obtained from the resulting correlation output. After correcting the component estimated value by subtracting therefrom the bias component, each received level ratio $\rho_n$ to the overall received power is calculated by the component ratio calculator 21 for each component. Such a calculation is conducted after the training signal in each received burst signal is once stored. The total amount of processing required for estimating the multipath component by the least squares method or the like is particularly large; hence, it is difficult in an ordinary transmission system to calculate it in real time.

Figure 5:
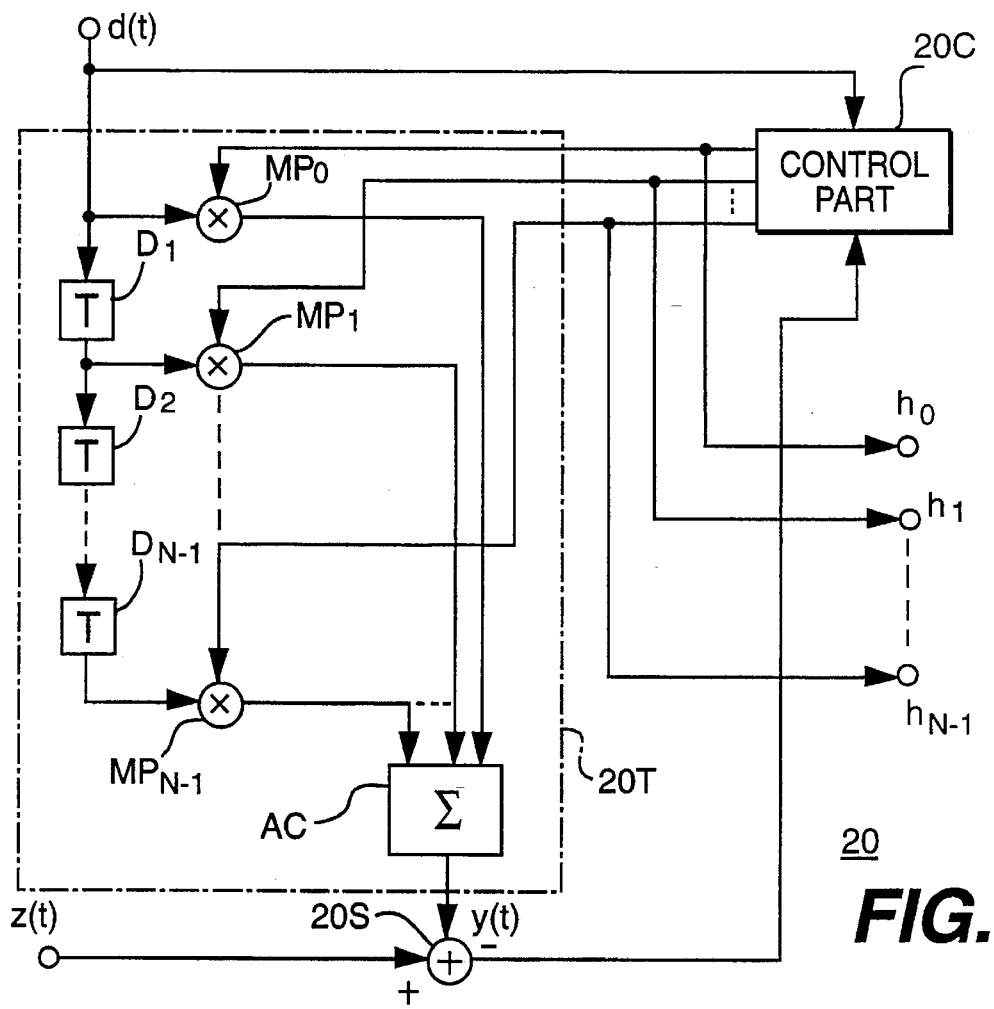
FIG. 5 is a block diagram illustrating another example of the multipath component detector.

FIG. 5 shows an example of the multipath component detector 20 in the FIG. 2 embodiment formed as a replica generating type multipath component detector. The received input signal z(t) is applied to a subtractor 20S in the replica generating type multipath component detector 20. On the other hand, the training signal TRN is input as the reference signal d(t) from the register 18. The reference signal is converted, by the N-1 series-connected delay elements $D_1, D_2, \ldots, D_{N-1}$ in a transversal filter 20T, to N reference signals d(t-nT) each delayed n (n=0, 1, ..., N-1) times the modulation symbol timing interval T. In the transversal filter 20T, the first-stage delayed input and the N reference signals d(t-nT) from the tap outputs of the respective delay stages are multiplied by complex tap coefficients $h_0, h_1, \ldots h_{N-1}$ from a control part 20C in the multipliers $MP_0, MP_1, \ldots, MP_{N-1}$, respectively, and the multiplied outputs are combined in an adder AC.

The complex tap coefficients $h_0, h_1, \ldots, h_{N-1}$ are controlled by the control circuit 20C so that the combined wave y(t) becomes a replica of the received signal in the training signal receiving period. That is, the control circuit 20C controls the complex tap coefficients $h_0, h_1, \ldots, h_{N-1}$, for example, by the least squares method in such a manner as to minimize the absolute value of the error component e(t) resulting from the subtraction of the combined wave y(t) from the received signal z(t). The complex tap coefficients thus obtained are estimated values of the received components $h_0, h_1, \ldots, h_{N-1}$ at the N timings 0, T, ..., (N-1)T; hence, they are outputted intact from the multipath component detector 20. These multipath signal components $h_n$ are provided to the component ratio calculator 21 in FIG. 2, wherein the level ratios $\rho_n$ of the respective received signal components to the overall received power are calculated. This scheme also calls for the processing of estimating the multipath components as is the case with the scheme of FIG. 2; thus, real time processing is usually difficult.

Figure 6:
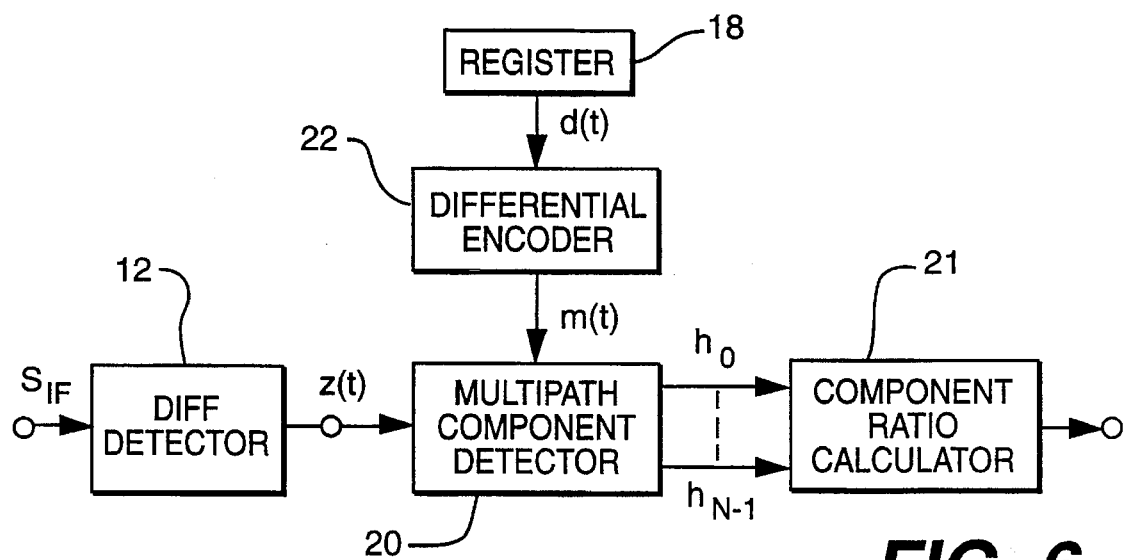
FIG. 6 is a block diagram illustrating another example of the delay spread sensor.

While the FIG. 2 embodiment has been described to use the IQ detector output of the received intermediate-frequency signal $S_{IF}$ as the input signal z(t) to the multipath component detector 20, a differentially detected output of the intermediate-frequency signal may be used as the input signal z(t). An example of such a scheme is shown in FIG. 6. The multipath component detector 20 may be of the either FIG. 3 or FIG. 5 configuration. In this embodiment, the intermediate-frequency signal $S_{IF}$ is differentially detected by the differential detector 12 and its output z(t) is input into the multipath component detector. In order that the modulation format of the reference signal whose correlation to the received signal z(t) is to be detected may match the modulation format of the latter, the training signal d(t) is applied to a differential encoder 22 and its output signal m(t) is provided as the preknown reference signal to the multipath component detector 20. For instance, in the case of a delay within one symbol, the input signal z(t) contains the components m(t) and m(t-T). Hence, amounts substantially proportional to the magnitudes of the signal components $h_0$ and $h_1$ of each path can be extracted as the correlation outputs by the correlation calculation referred to above with respect to FIG. 3 or 5. The calculation equation and method for calculating the received signal component level ratio $\rho_n$ to the overall received power by the component ratio calculator 21 from the correlation output components are the same as in the FIG. 2 embodiment. The correlation processing of the differentially detected output is relatively easy and can be carried out in real time without storing each burst signal in the buffer memory.

Figure 7:
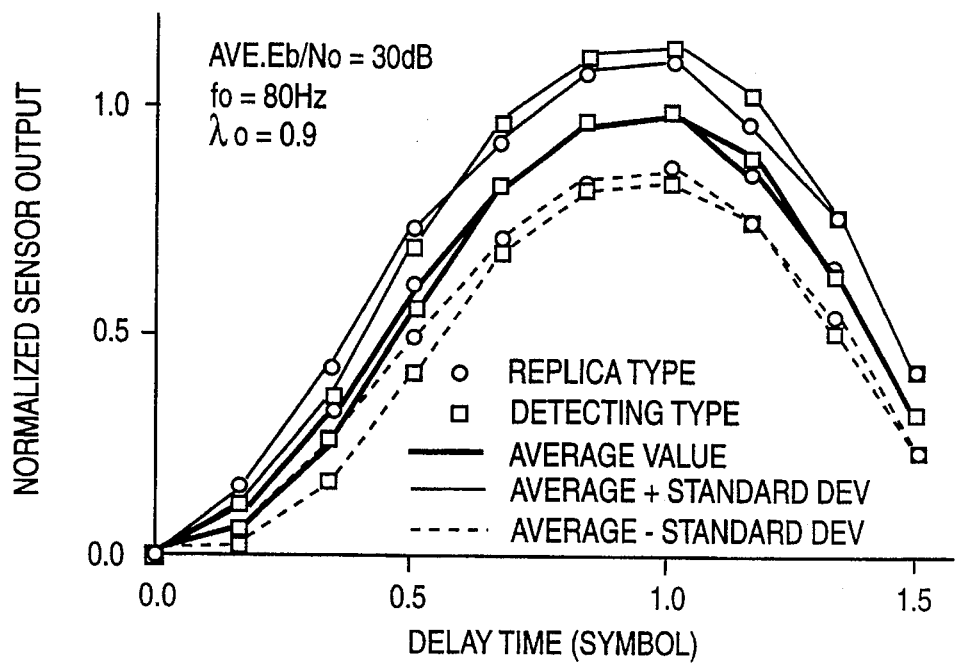
FIG. 7 is a graph showing the results of computer simulations on the characteristics of a differential detection type and a replica type delay spread sensor.

In FIG. 7 there are shown the results of computer simulations done on the received component level ratio $\rho$ in the case of two-wave multipath propagation composed of the direct wave and one delayed wave by the replica type delay spread sensor of the FIG. 2 embodiment using the multipath component detector 20 of FIG. 5 and the differential detection type delay spread sensor of the FIG. 5 embodiment employing the multipath component detector 20 of FIG. 3. The abscissa represents the delay time (unit: symbol) and the ordinate represents the normalized sensor output. Here, the direct wave and the delayed wave are assumed to be received (N=2). The curves show average value characteristics and average value standard deviation characteristics. In this case, however, normalization is made so that the average value becomes 1 at a delay time of one symbol. Since the correlation processing is performed until one symbol delay (n=1), the maximum value of the average value of the received component level ratio $\rho_1$ becomes about 1.0. When the delay exceeds one symbol, $\rho_2$ needs to be calculated. For example, the sum of $\rho_1$ and $\rho_2$ reaches its peak when the delay time is one-symbol and two-symbol, and the value of the sum gradually decreases as the delay increases in excess of the two-symbol time. As shown in FIG. 7, the characteristics of the two types of sensors are substantially the same. Besides, the delay amounts within the one-symbol time and the sensor outputs have a one-to-one correspondence. Thus, the sensors can be utilized as highly accurate delay spread sensors.

Figure 8:
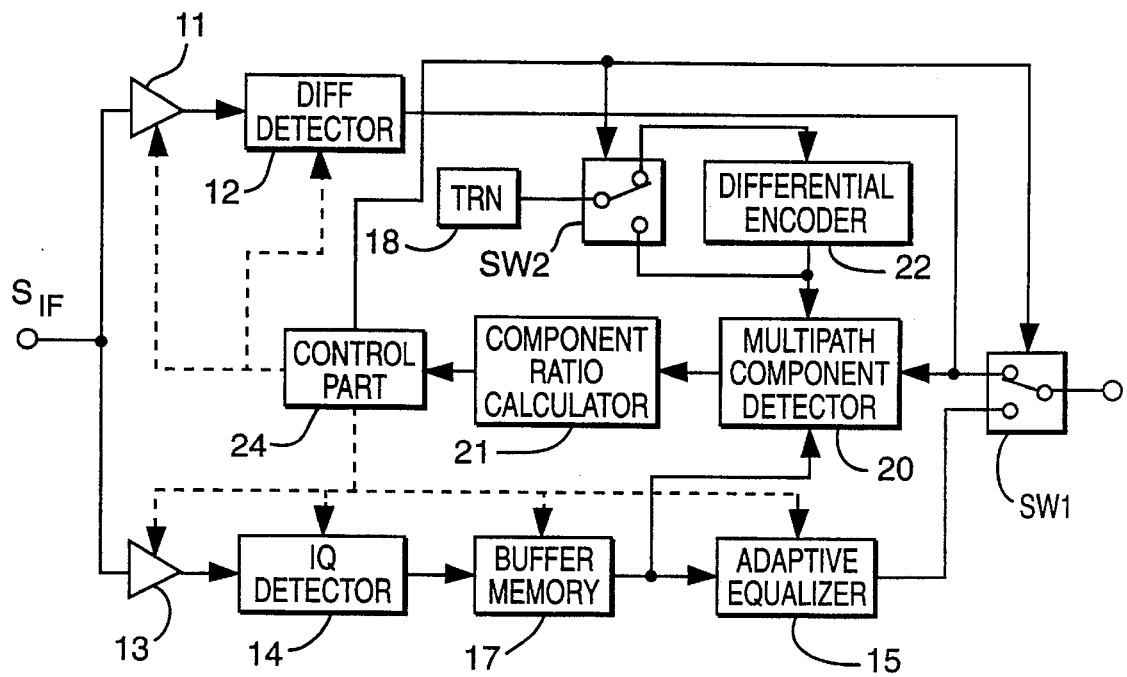
FIG. 8 is a block diagram illustrating the construction of a detection switching circuit using the delay spread sensor according to the present invention.

In FIG. 8 there is illustrated an embodiment of the detection switching circuit in a receiver which uses the delay spread sensor of the present invention, the parts corresponding to those in FIGS. 1A, 2 and 6 being identified by the same reference numerals. The multipath component detector 20, the component ratio calculator 21 and the differential encoder 22 constitute a delay spread sensor corresponding to that depicted in FIG. 6. The illustrated detection switching circuit adds, in the receiving unit of FIG. 1A, the training signal holding register 18 and a switch SW2 which is ganged with a switch SW1 to provide the training signal from the register 18 as the reference signal via the differential encoder 22 or directly to the multipath component detector 20.

The multipath component detector 20 can be either of the differential detection type shown in FIG. 3 or the replica generating type shown in FIG. 5. In the training signal period of the received signal the training signal from the register 18 is applied as the reference signal d(t) to the multipath component detector 20, wherein its correlation to the received signal is detected. The correlation to the differentially detected output from the differential detector 12 can be detected in real time, but with respect to the IQ detected output, from the IQ detector 14 some delay is caused in the component estimation processing, since a buffer memory is used. The control part 24 controls switching between the differential detector and the adaptive equalizer through utilization of the received component level ratios calculated by the component ratio calculator 21 from the respective received signal levels obtained by the correlation processing. Since the propagation characteristic for each burst varies due to fading, the value of the component ratio $\rho_n$ that is calculated for each burst varies even for the same delay component $\rho_n$. Then, calculations are made not only of an instantaneous value $\rho_i$ of the path component ratio of a noted specific path component for each burst but also of a value $\rho_a$ of its path component ratio averaged with a certain time constant (about 10-burst period, for instance). The control part performs optimal switching between the delay detector and the adaptive equalizer while observing the variations in the value $\rho_i$ and $\rho_a$. The IF signal inputted to the input terminal IN is branched into two, one of which is limiter-amplified by the nonlinear limiter amplifier 11 and then detected by the delay detector 12. The other branched signal is linearly amplified by the linear amplifier 13 and then applied to the IQ detector 14, wherein the amplitudes of the in-phase and quadrature components are extracted. These components are stored in a buffer memory 17. The signal stored in the buffer memory 17 is applied to the adaptive equalizer 15. Based on the output from the component ratio calculator 21, the control part 24 decides which of the differential detector 12 and the adaptive equalizer 15 is to be used and controls the switch SW1 accordingly to switch the detected output to the selected one. Furthermore, the control circuit turns ON the power supply to the circuits concerned and turns OFF the power supply to the circuits not concerned to save power. A variety of algorithms can be used for concrete switching through use of the calculated values $\rho_i$ and $\rho_a$. The simplest switching scheme pays attention to the value $\rho_a$ alone and that as long as the multipath component detector and the component ratio calculator which permit the detection of the delay spread to be observed are used, the sensor output monotonously increases with respect to the delay time as shown in FIG. 7. Let the threshold value of the value $\rho_a$ be represented by $\rho_t$. When $\rho_a > \rho_t$, the adaptive equalizer is used, whereas when $\rho_a < \rho_t$, the delay detector is used.

The FIG. 8 embodiment of the detection switching circuit has been described in connection with the case where it selects the differential detector output or adaptive equalizer output by the switch SW1, depending upon whether the delay spread detected by the delay spread sensor is smaller or larger than a predetermined value, while at the same time it turns OFF the power supply to the circuit elements associated with the nonselected output. In the case of the adaptive equalizer being selected, however, the received signal is already stored in the buffer memory 17, and consequently, even if it is detected in the training period that the delay of the stored burst is small, the signal can no longer be detected by the differential detector 12. Even when the average delay spread is larger than a predetermined value, if the level of only one of signal components of a plurality of paths is sufficiently larger than the others, the signal components of the other paths can be ignored; hence, the received signal can be detected by the differential detector with a sufficiently low bit error rate.

Figure 9:
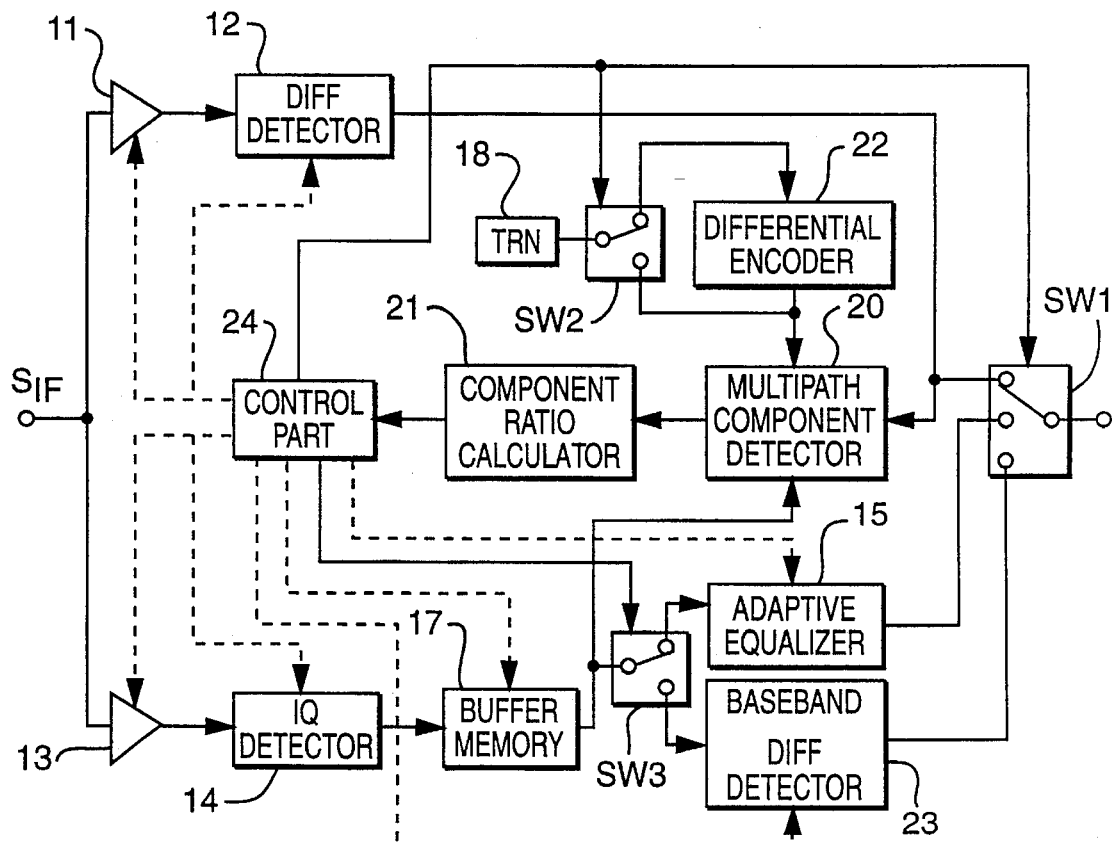
FIG. 9 is a block diagram illustrating another embodiment of the detection switching circuit according to the present invention.

Then, even if the measured delay spread is larger than a predetermined value, the probability of operation of the adaptive equalizer could be further lessened by performing the detection switching in such a manner as to select the baseband differential detection or adaptive equalization processing, depending upon whether the signal component level of any one of the paths is sufficiently higher than the signal component levels of all the other paths. In FIG. 9 there is illustrated an embodiment of the detection switching circuit that carries out such an idea. The actual switching algorithm utilizes the values $\rho_i$ as well as $\rho_a$. A predetermined value $\alpha$ larger than 1 is newly set; when $\rho_i > \alpha \rho_a$ with respect to the average value $\rho_a$ of the value $\rho_i$, that is, when the delayed wave is sufficiently larger than the direct wave, or when $\rho_i < \rho_a/\alpha$, that is when the direct wave is sufficiently larger than the delayed wave, the baseband differential detection takes place. When $\rho_a/\alpha < \rho_i < \alpha \rho_a$, the direct wave and the delayed wave are substantially the same, hence the adaptive equalizer is used. Of course, when $\rho_a < \rho_t$, an ordinary delay detector is used.

Figure 10:
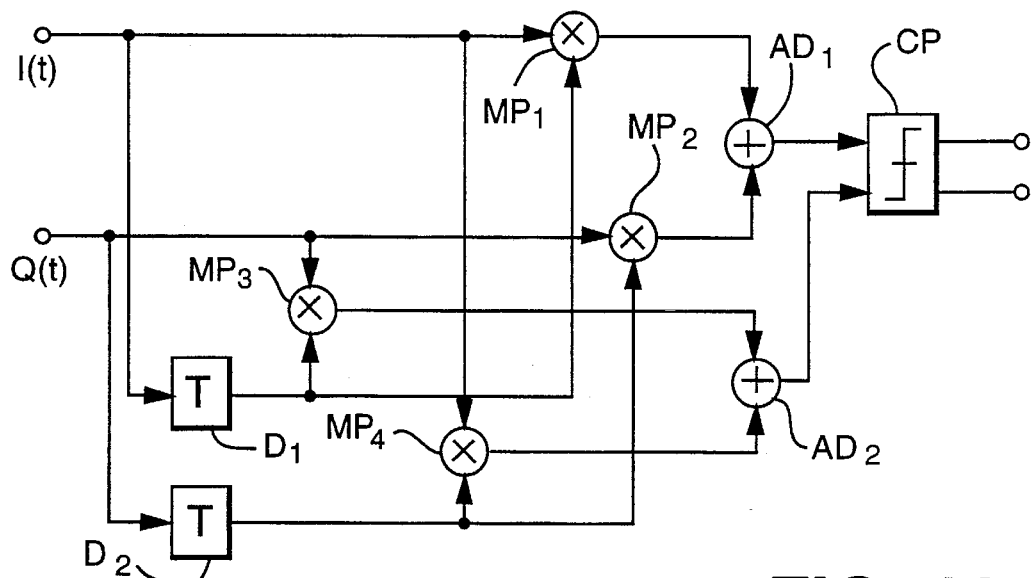
FIG. 10 is a block diagram showing an example of the construction of a baseband delay detector in FIG. 9.

In FIG. 9 the parts corresponding to those in FIG. 8 are identified by the same reference numerals, and a description will be given of only differences between this embodiment and the FIG. 8 embodiment. In this embodiment, the read output from the buffer memory 17 is provided via a switch SW3 to a selected one of the adaptive equalizer 15 and a baseband differential detector 23. The baseband differential detector 23 has such a construction as depicted in FIG. 10 when the modulation signal is DPSK, for instance. An in-phase component I(t) and a quadrature component Q(t), which are IQ detected outputs read out of the buffer memory 17 and provided via the switch SW3, are delayed for the one-symbol time by delay elements $D_1$ and $D_2$, respectively; these delayed components are multiplied by the next symbols in multipliers $MP_1$ and $MP_2$, respectively, and at the same time, they are multiplied by the next symbols orthogonal to each other in multipliers $MP_3$ and $MP_4$. The outputs from the multipliers $MP_1$ and $MP_2$ are added together by an adder $AD_1$ and the outputs from the multipliers $MP_3$ and $MP_4$ are added together by an adder $AD_2$. The two adder outputs are respectively compared by a decision circuit CP with a threshold level for the decision of their levels. The results of the decisions are outputted as an I component code sequence and a Q component code sequence.

The outputs from the adaptive equalizer 15 and the baseband delay detector 23 are inputted into the switch SW1, from which they and the output from the differential detector 12 are selectively outputted as a detected signal. The multipath component detector 20 is always supplied with the detected output from either one of the differential detector 12 and the IQ detector 14 which is in operation, and hence it is able to detect the levels of the multipath signal components from the supplied detected output in the state of its reception. The component ratio calculator 21 is supplied with the signal components $h_0, h_1, \ldots, h_{N-1}$ of the respective paths from the multipath component detector 20 and calculates the delay spread from the signal components and their ratios to the overall received signal level and provides the thus obtained value of the delay spread to the control part 24. The control part 24 performs such processing as listed below.

(1) The control part makes a check to see if the value $\rho_a$ is smaller than a predetermined value $\rho_t$; if so, it holds the differential detector 12 in the state of operation (hereinafter referred to as a DD mode), and at the same time controls the switch SW1 to select the output from the differential detector 12. At this time, the switch SW2 is selectively connected to the input side of the differential encoder 22, and consequently, the training signal from the register 18 is applied to the differential encoder 22 in the training signal period of the received signal and the differentially encoded training signal is applied as the reference signal to the multipath component detector 20.

(2) When the detected value $\rho_a$ is larger than the predetermined value $\rho_t$, the multipath component detector 20 performs the detection of the multipath component on the IQ detected output read out of the buffer memory 17. In this case, the power supply to the limiter amplifier 11 and the differential detector 12 is suspended, but power is supplied to the linear amplifier 13, the IQ detector 14, the memory 17 and the adaptive equalizer 15. (2-1) When $\rho_a/\alpha < \rho_i < \alpha \rho_a$, the adaptive equalizing detection (hereinafter referred to as an EQL mode) takes place, the output of the adaptive equalizer 15 is selected by the switch SW1, the output of the register 18 is connected by the switch SW2 to the multipath component detector 20 side and the output of the memory 17 is connected by the switch SW3 to the adaptive equalizer 15 side. (2-2) When $\rho_i < \rho_a/\alpha$ or $\rho_i > \alpha \rho_a$, the switch SW1 is connected to the baseband differential detector 23 side, the switch SW2 is connected to the input side of the differential encoder 22 and the switch SW3 is connected to the baseband delay detector 23 side. At the same time, the power supply to the adaptive equalizer 15 is stopped and the power supply to the base band delay detector 23 is turned ON (hereinafter referred to as a BD mode). This permits further reduction of the power dissipation. The BD mode is temporarily used when the operation proceeds from the EQL mode to the DD mode.

Figure 11:
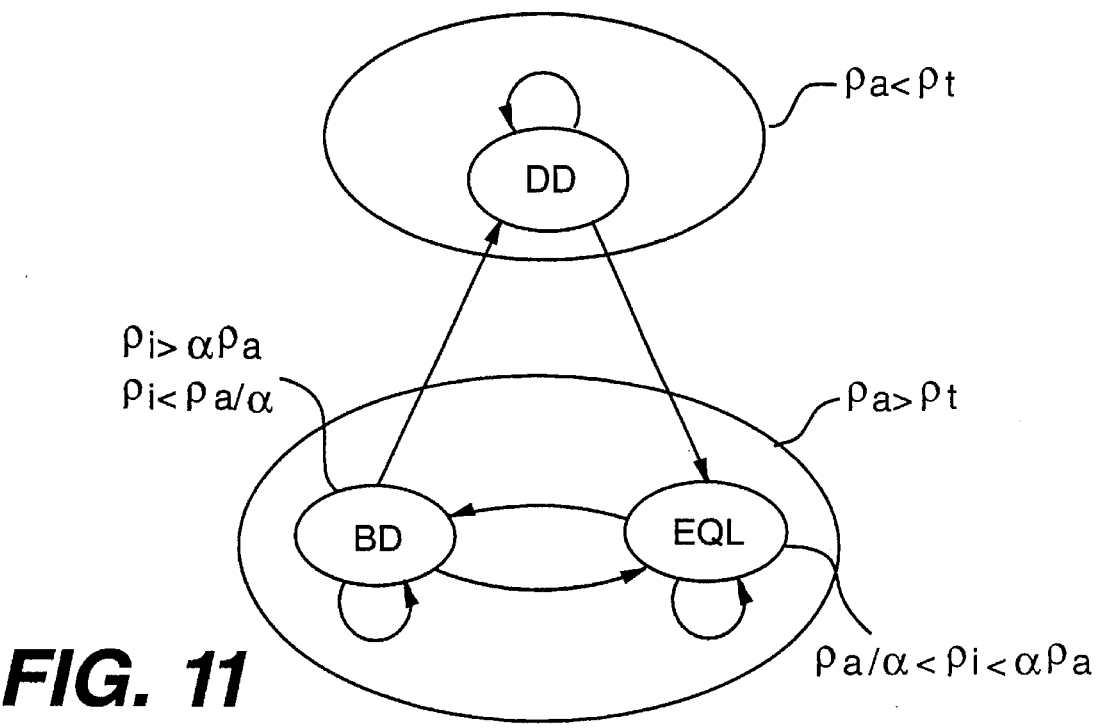
FIG. 11 is a transition diagram of a detecting operation mode in the FIG. 9 embodiment.

FIG. 11 shows the transition of the states of the above-mentioned detection modes DD, EQL and BD.

Figure 12:
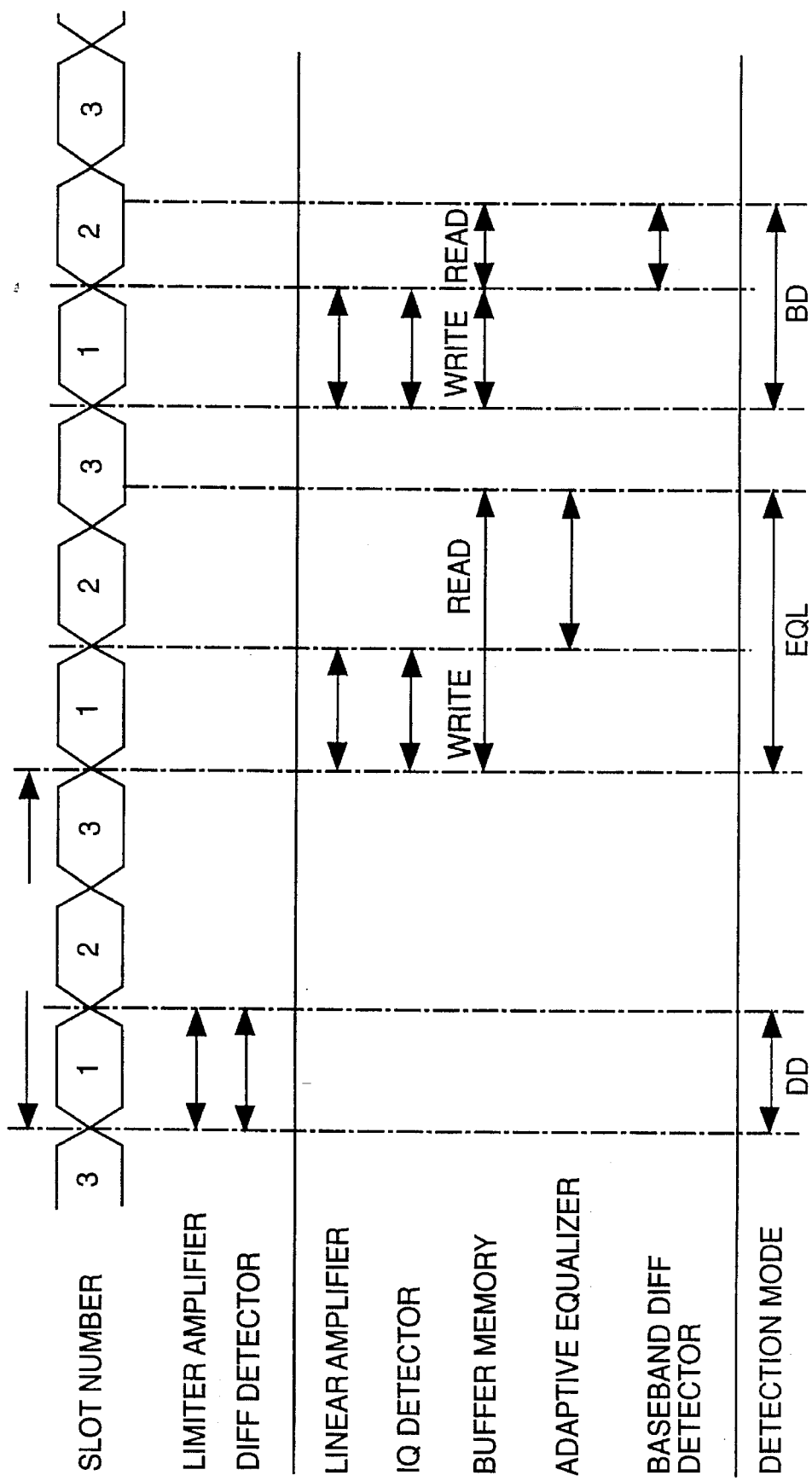
FIG. 12 is a timing chart showing the state of power supply to respective parts in respective modes of operations in the FIG. 9 embodiment.

FIG. 12 shows the power supply to respective parts of the FIG. 9 embodiment in the respective modes of operation. For brevity's sake, it is assumed that in the case of the TDMA scheme in which each frame consists of three slots, the burst signal is received in a specified slot (in the first slot in this example) of each frame, and with respect to the DD, EQL and BD modes of operation of the receiving unit, the respective parts in the receiving circuit which are supplied with power are indicated by the arrows. Above the thick horizontal line is the case where the delay spread is smaller than a predetermined value and the below the line is the case where the delay spread is larger than the predetermined value. As is evident from FIG. 12, the chance of the power supply to the adaptive equalizer 15 being turned ON in the FIG. 9 embodiment is smaller than in the FIG. 8 embodiment; hence, the power dissipation can be further reduced.

Figure 13:
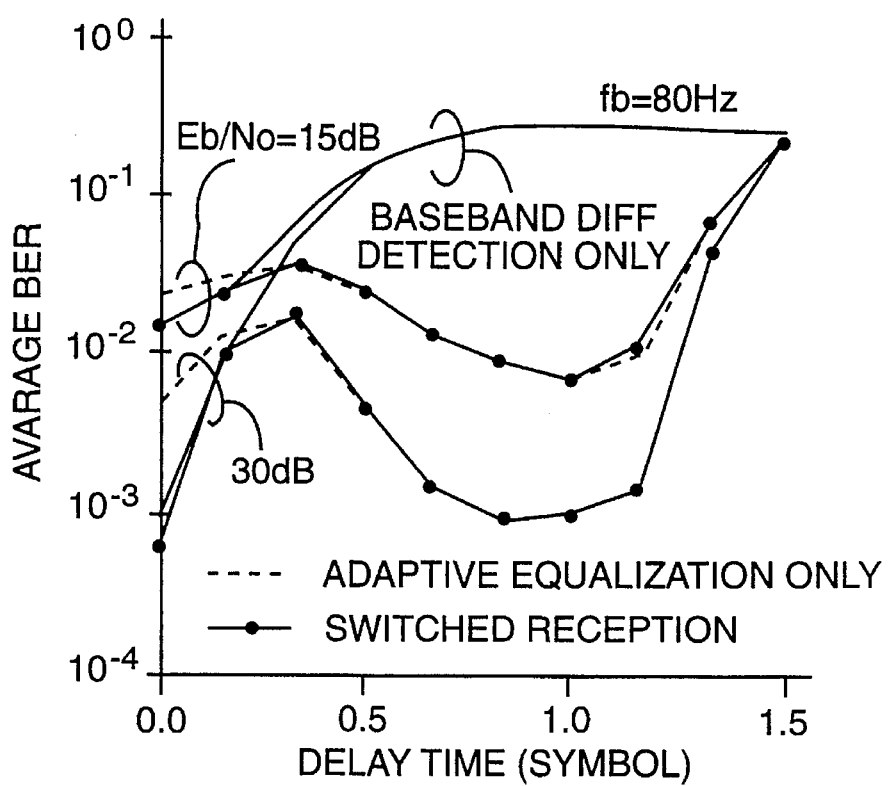
FIG. 13 is a graph showing the relationship between an average BER and the delay time in the case of detection switching being carried out in the FIG. 9 embodiment.

FIG. 13 shows the results of computer simulations intended to confirm the effect of selective switching between the differential detector, the adaptive equalizer and the baseband differential detector in a three-channel TDMA mobile communication system. The bit rate used was 40 kb/s and the differentially coded QPSK scheme was used for modulation. The training signal was 10-symbol long and the data signal 64-symbol. The timing synchronization and frame synchronization with the direct wave were made complete. The maximum Doppler frequency fD was set to 80 Hz. The bias components in time-averaged correlation functions between the differentially detected output and preknown differential symbol of the training signal were 0 and 0.25 for the direct wave component and the delayed wave component, respectively. The average level ratio of the channel between the direct wave and the delayed wave was set to 1. In FIG. 13 there is shown the relationship between the average BER (Bit Error Rate) and the delay time (unit: symbol) at the time of switching between the detectors. The abscissa represents the delay time and the ordinate the average BER. It will be seen that one of the differential detector and the adaptive equalizer which is smaller in the average BER is selected substantially optimally. Besides, since the utilization factor of the adaptive equalizer at the delay time 0 was 0.35%, it is considered that perfect control is effected.

As described above, the present invention permits the implementation of a delay spread sensor and a detection switching circuit which are high in accuracy and do not require the use of a wide-band signal. The delay spread sensor of the present invention can be used both in IQ detection and in differential detection, and hence has general versatility. Further, it provides substantially the same characteristic in either detection and is accurate. Since the magnitude of the delay spread can be detected by a short signal such as a training signal, the channel can be optimized every burst. The application of the invention to the switching between the differential detector and the adaptive equalizer, for example, will improve the transmission characteristic. The use of a more elaborate algorithm enables minimization of the power dissipation, too. Other than such optimal demodulation circuit selection, the present invention permits measurements of data in the dead zone caused by the delay spread without stopping the system, and hence enables efficient operations of the system and setup planning thereof.

Having thus described our invention, we claim:

1. A delay spread sensor for measuring a delay spread between received signal components caused by multipaths in a received signal which has a predetermined training signal, comprising:

detecting means responsive to the received signal for producing a detection signal;

reference signal generating means for generating a reference signal corresponding to the training signal during a training signal period of the received signal;

multipath component detecting means for producing correlation between the detection signal and each of nondelayed and delayed reference signals as the levels of received signal components corresponding to respective propagation paths of said multipaths; and component ratio calculating means for calculating the ratio of each of the levels of said received signal components to a total level of the received signal components.

2. The delay spread sensor of claim 1, wherein said multipath component detecting means comprises: a delay circuit of N−1 delay stages which delays said reference signal to generate N-1 delayed reference signals sequentially delayed for a one-symbol time; N multipliers for multiplying said reference signal and said N−1 delayed reference signals by said detection signal respectively; and N accumulators which accumulate the outputs from said N multipliers and provide the added outputs as magnitudes of correlation, respectively.

3. The delay spread sensor of claim 1, wherein said multipath component detecting means comprises: a transversal filter which generates a replica of said input signal; difference means which outputs the difference between said replica and said detection signal; and control means which controls the tap coefficients of said transversal filter to minimize said difference and outputs said tap coefficients as the levels of said multipath components.

4. The delay spread sensor of claim 1, wherein said detecting means comprises IQ detector means for providing a quasi-synchronously detected output of the received signal as said detection signal to said multipath component detecting means.

5. The delay spread sensor of claim 1, wherein said detecting means comprises differential detecting means for providing a differentially detected output of the received signal, as said detection signal, to said multipath component detecting means, and said reference signal generating means comprises differential encoding means for providing a differentially encoded information signal, as said reference signal, to said multipath component detecting means.

6. A detection switching circuit comprising:

nonlinear amplifier means for nonlinearly amplifying a received signal including a predetermined training signal;

differential detecting means for differentially detecting the output from said nonlinear amplifier means to produce a differential detection signal;

linear amplifier means for linearly amplifying said received signal;

reference signal generating means for generating a reference signal corresponding to the training signal;

IQ detecting means for quasi-synchronously detecting the output from said linear amplifier means to produce an IQ detection signal;

adaptive equalization means supplied with the IQ detection signal from said IQ detecting means, for decoding the IQ detection signal through adaptive equalization processing;

multipath component detecting means selectively supplied with either one of said differential detection signal and said IQ detection signal, for producing correlation between a selected one of said differential detection signal and said IQ detection signal and each of said reference signal and delayed reference signals during the training signal period of said received signal and for outputting the correlation as the level of each of the received signal components;

component ratio calculating means for calculating the ratio of the level of each of said received signal components to a total level of the received signal components detected by said multipath component detecting means;

output switching means for selectively outputting either one of said differential detection signal and the output of said adaptive equalization means; and control means which controls said output switching means on the basis of at least one of said ratios to select either one of said differential detection signal and the output of said adaptive equalization means and to stop the power supply to one of said differential detecting means and said adaptive equalization means which corresponds to the nonselected output.

7. The detection switching circuit of claim 6, wherein said reference signal generating means comprises register means for holding said predetermined training signal, and reference signal selecting means for providing, as said reference signal to said multipath component detecting means, said training signal from said register means as it is or after differentially encoding it, depending upon whether or not the output from said adaptive equalization means is selected.

8. The detection switching circuit of claim 6 or 7, which further comprises baseband differential detecting means for differentially detecting said IQ detection signal from said IQ detecting means to provide a baseband differential detection signal, detection selecting switch for selectively providing said IQ detection signal to either one of said adaptive equalization means and said baseband differential detecting means, and wherein said output switching means is also supplied with said baseband differential detection signal from said baseband differential detecting means, said control means being operative to control said output switching means on the basis of the levels and delay spread of said multipath components to selectively output a desired one of said differential detection signal, the output of said adaptive equalization means and said baseband differential signal and to stop the power supply to at least that one of said differential detecting means, said adaptive equalization means and said baseband differential detecting means which corresponds to the nonselected detected output.

* * * * *